(12) United States Patent
Maslak et al.

(10) Patent No.: US 10,341,849 B2
(45) Date of Patent: Jul. 2, 2019

(54) ANYCAST MANIFEST RETRIEVAL, UNICAST CONTENT RETRIEVAL

(71) Applicant: Level 3 Communications, LLC, Broomfield, CO (US)

(72) Inventors: Joelle T. Maslak, Golden, CO (US); Kevin C. Johns, Erie, CO (US)

(73) Assignee: Level 3 Communications, LLC, Broomfield, CO (US)

( * ) Notice: Subject to any disclaimer, the term of this patent is extended or adjusted under 35 U.S.C. 154(b) by 6 days.

(21) Appl. No.: 15/673,048

(22) Filed: Aug. 9, 2017

(65) Prior Publication Data
US 2018/0063705 A1     Mar. 1, 2018

Related U.S. Application Data

(60) Provisional application No. 62/382,081, filed on Aug. 31, 2016.

(51) Int. Cl.
| | |
|---|---|
| *H04L 12/16* | (2006.01) |
| *H04W 8/24* | (2009.01) |
| *H04W 28/20* | (2009.01) |
| *H04W 40/04* | (2009.01) |
| *H04W 72/04* | (2009.01) |
| *H04W 40/20* | (2009.01) |
| *H04L 29/08* | (2006.01) |
| *H04L 29/12* | (2006.01) |

(52) U.S. Cl.
CPC ............ *H04W 8/245* (2013.01); *H04L 61/00* (2013.01); *H04L 67/2842* (2013.01); *H04W 28/20* (2013.01); *H04W 40/04* (2013.01); *H04W 40/20* (2013.01); *H04W 72/0433* (2013.01); *H04L 67/02* (2013.01); *H04L 67/18* (2013.01)

(58) Field of Classification Search
CPC ........... H04W 4/00; H04W 4/02; H04W 4/06; H04W 4/12; H04W 4/18
USPC .................. 370/328; 455/414.1, 414.2, 456.1
See application file for complete search history.

(56) References Cited

U.S. PATENT DOCUMENTS

| | | | |
|---|---|---|---|
| 2003/0079027 A1* | 4/2003 | Slocombe | ............... H04L 29/06 709/229 |
| 2012/0150953 A1 | 6/2012 | Costanzo et al. | |
| 2015/0188994 A1* | 7/2015 | Marshall | ................. H04L 67/10 709/203 |

(Continued)

OTHER PUBLICATIONS

International Search Report dated Oct. 31, 2017, Int'l Appl. No. PCT/US17/046118, Int'l Filing Date Aug. 9, 2017; 3 pgs.

(Continued)

*Primary Examiner* — Temica M Beamer (57) ABSTRACT

Provided is a content delivery method and architecture for delivering content from a node in a content delivery network (CDN) using an anycast address to direct a requesting device to access a content manifest. The manifest server of the CDN may select the provided manifest based on information received from the requesting device and/or any other network information, may alter attributes of the manifest itself, or direct the requesting device to a different device or manifest server of the CDN to obtain the manifest. The selection of the manifest, alteration of the manifest, or new location to obtain the manifest causes the connection for content to occur at one or more servers accessible through a unicast address, rather than an anycast address.

20 Claims, 6 Drawing Sheets

(56) References Cited

U.S. PATENT DOCUMENTS

2015/0288732 A1   10/2015  Phillips
2016/0119279 A1    4/2016  Maslak et al.
2017/0026712 A1*  1/2017  Gonder ................. H04L 65/605
2018/0013810 A1*  1/2018  Gordon ............ H04N 21/23439

OTHER PUBLICATIONS

Written Opinion of the International Searching Authority dated Oct. 31, 2017, Int'l Appl. No. PCT/US17/046118, Int'l Filing Date Aug. 9, 2017; 5 pgs.

International Preliminary Report on Patentability, dated Mar. 5, 2019, Int'l Appl. No. PCT/US17/046118, Int'l Filing Date Aug. 9, 2017; 7 pgs.

\* cited by examiner

ANYCAST MANIFEST RETRIEVAL, UNICAST CONTENT RETRIEVAL

CROSS-REFERENCE TO RELATED APPLICATION

This application is related to and claims priority under 35 U.S.C. § 119(e) from U.S. Patent Application No. 62/382,081, filed Aug. 31, 2016 entitled "ANYCAST MANIFEST RETRIEVAL, UNICAST CONTENT RETRIEVAL," the entire contents of which is incorporated herein by reference for all purposes.

TECHNICAL FIELD

Aspects of the present disclosure involve content delivery networks, and more particularly involve retrieving a content manifest using an anycast network address, and then selecting a node of a content delivery network with a unicast address to retrieve the content where the selected node is based, in part, on the anycast node contacted to retrieve the manifest.

BACKGROUND

A content delivery network (CDN) is a sophisticated and large collection of computers (e.g., content servers) and networking devices that is used to deliver various forms of content, such as video, web pages, and images, to devices over networks including the Internet. So, for example, when a user operating a smart phone, laptop, tablet or other computing device requests a video to play on the device, a CDN may be contacted and deliver the video to the computing device where it is played. As more and more content is delivered over networks, refinements and advances to CDNs, as well as the infrastructure supporting the CDN, are needed and happening constantly. Such advances involve reducing cost, increasing capacity, optimizing from where in the CDN content is delivered and where it is stored to optimize delivery, among other challenges. Often an improvement in one area of the network may affect another area of the network. It is with these issues in mind, among many others, that aspects of the present disclosure were conceived and developed.

SUMMARY

One implementation of the present disclosure may take the form of a method of serving content in a network. The method may include the operations of receiving a request for a content manifest at a particular serving node associated with an anycast address, the particular serving node being one of a plurality of manifest serving nodes associated with the anycast address and the request comprising information of a requesting device in communication with the particular serving node, serving the content manifest to the requesting device, the content manifest based on the information of the requesting device in the request, the content manifest comprising at least one unicast address of a content delivery node suitable for delivering the content to the requesting device, and transmitting the content from the content delivery node associated with the unicast address to the requesting device.

Another implementation of the present disclosure may take the form of a content delivery network (CDN). The CDN may include an anycast manifest server receiving a request for a content manifest, the anycast manifest server being one of a plurality of manifest serving nodes associated with an anycast address and the request comprising information of a requesting device in communication with the CDN and a unicast content server transmitting at least a portion of content file to a requesting device in communication with the unicast content server. Further, the anycast manifest server may provide the content manifest to the requesting device based on the information of the requesting device in the request, the content manifest comprising at least one unicast address associated with the unicast content server.

Yet another implementation of the present disclosure may take the form of a server of a content delivery network (CDN). The server may include at least one communication port for receiving a request for a content manifest from a content requesting device in communication with the CDN, the request for the content manifest received in response to a broadcast of an anycast address of the server and comprising information of the content requesting device, a processing device, and a computer-readable medium connected to the processing device. The computer-readable medium is configured to store information and instructions that, when executed by the processing device, performs the operations of serving the content manifest to the content requesting device based on the information of the content requesting device in the request, the content manifest comprising at least one unicast address of a content delivery node of the CDN suitable for delivering the content to the content requesting device and transmitting the content from the content delivery node associated with the unicast address to the content requesting device.

DETAILED DESCRIPTION

Aspects of the present disclosure involve a content delivery method and architecture for delivering content from a node in a content delivery network (CDN) using an anycast address to direct a requesting device to access a content manifest, also referred to herein as a manifest file. In one embodiment, a manifest server of the CDN may select the provided manifest based on information received from the requesting device and/or any other network information. In other embodiments, the manifest server may alter attributes of the manifest itself (manifest rewrite) or direct the requesting device to a different device or manifest server of the CDN to obtain the manifest. The selection of the manifest, alteration of the manifest, or new location to obtain the manifest causes the connection for content, which may be chunks of content defined in the manifest, to occur at one or more servers accessible through a unicast address, rather than an anycast address. Thus, the original short lived connection (or connections) to obtain the manifest from the manifest server involves an anycast address. The information received from the manifest associated with the anycast address, alone or in conjunction with information about the device requesting the manifest, may then be used in establishing a unicast connection to obtain the content from a content providing server.

Utilizing an anycast address to provide a manifest for a requested content to a requesting device may provide several performance advantages to the CDN. For example, it is generally accepted that shorting the distance between a content providing device and a receiving device may improve the speed at which the content is received. Thus, many CDNs attempt to select content servers that are geographically near or logically near the requesting device to reduce the distance and time that the content is transmitted through the CDN. However, the CDN may not always know or otherwise determine where the requesting device is located to select an advantageous content server. By providing a manifest through an anycast-type addressing scheme, a requesting device may access a manifest server that is geographically near the requesting device. Further, because requested content may be large and be provided for several minutes or hours in a single session, selecting a content server that is not near the requesting device may negatively affect the performance of the CDN. By providing the CDN with a mechanism for adapting or altering the manifest information based on received information from the requesting device, a more advantageous content server may be selected and provided in the manifest as an absolute Uniform Resource Locator (URL) to improve the performance of the CDN. Further, the selected content server may be accessed through a unicast-addressing scheme to prevent overloading at the particular content server of the CDN. In this manner, an anycast address for the manifest server may provide information of the location/type of requesting device, which the CDN may utilize to generate or alter a manifest file or direct the requesting device to a particular content server accessible through a unicast address to improve the performance of the CDN.

Figure 1:
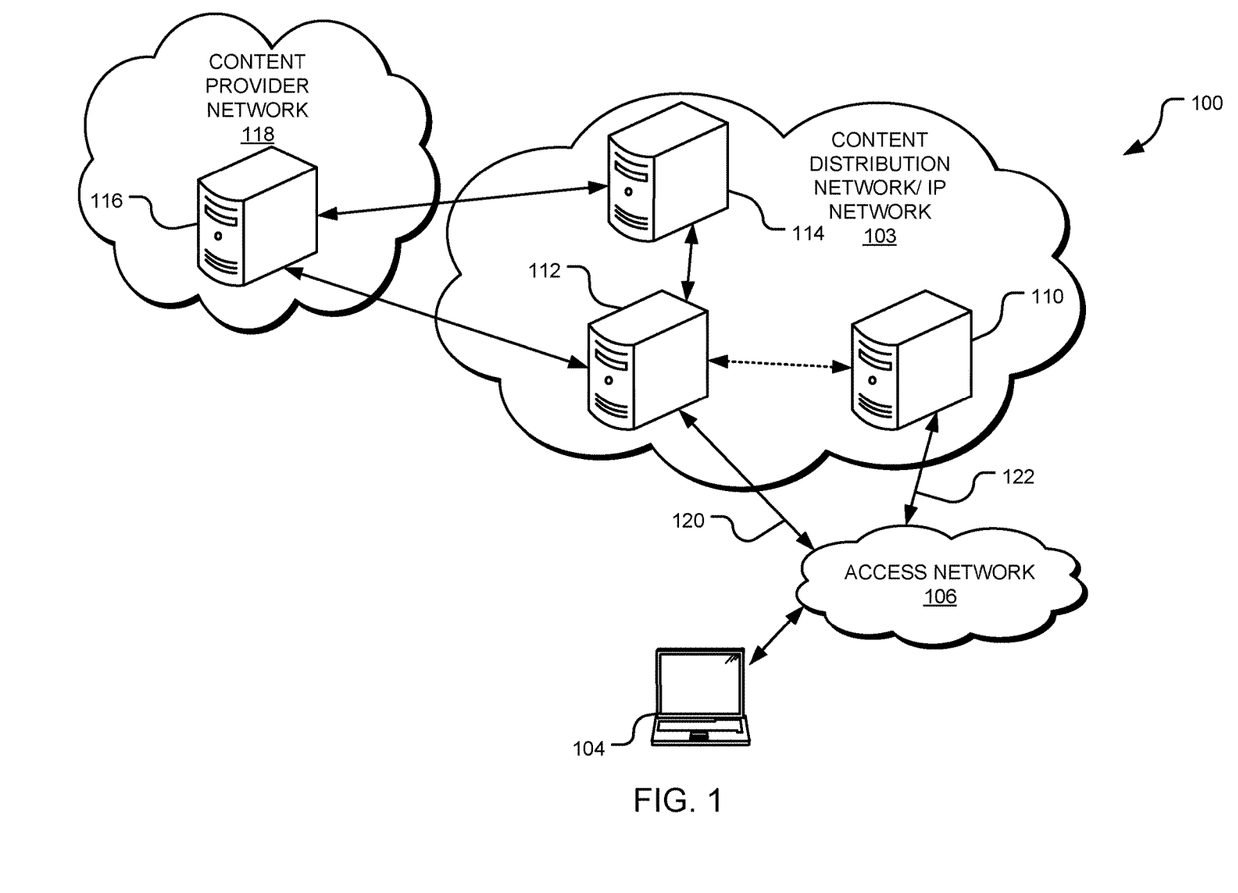
FIG. 1 is an example network environment for distributing content to an end user from a network, such as a content delivery network (CDN).

FIG. 1 is a general network environment 100 for distributing content to one or more users through which a manifest server may be accessed through an anycast address and a content server may be accessed through a unicast address. The concepts of an anycast-addressing scheme and a unicast-addressing scheme are discussed in more detail below with reference to the network of FIG. 2. In general, the network environment 100 of FIG. 1 provides a content delivery network (CDN) through which content may be provided to a requesting device. In particular, the network 100 receives a request for content from a user of the network and determines a server or content providing component within the network to provide the content to the user. Although illustrated in FIG. 1 as a content delivery network 100, it should be appreciated that aspects of the present disclosure may apply to any type of telecommunications network that utilizes IP addresses for connecting an end user to one or more components of the network. For example, aspects of the disclosure may be utilized to connect a user of the network to an endpoint in the network, a conferencing server, a virtual private network device, and the like. Thus, although the CDN architecture is used throughout the document as the example network architecture through which aspects of the present disclosure may be applied; other network architectures and configurations are similarly contemplated.

In one implementation of the network environment 100, a CDN 102 is communicably coupled to one or more access networks 106. In general, the CDN 102 comprises one or more components configured to provide content to a user upon a request and an underlying IP network through which the request is received and the content is provided. The underlying IP network associated with the CDN servers may be of the form of any type IP-based communication network configured to transmit and receive communications through the network and may include any number and types of telecommunications components. In this manner, CDN-based components may be added to an existing IP-based communication network such that the components receive a request for content, retrieve the content from a storage device, and provide the content to the requesting device through the supporting IP network. For simplicity, the use of the term "CDN" throughout this disclosure refers to the combination of the one or more content servers and the underlying IP network for processing and transmitting communications, unless otherwise noted.

In one embodiment, a user device 104 connects to the CDN 102 through one or more access networks 106 to request and receive content or content files from the CDN. The access network 106 may be under the control of or operated/maintained by one or more entities, such as, for example, one or more Internet Service Providers (ISPs) that provide access to the CDN 102. Thus, for example, the access network 106 may provide Internet access to a user device 104. In addition, the access network 106 may include several connections to the IP network of the CDN 102. For example, access network 106 includes access point 120 and access point 122. Also, the user device 104 may be connected to any number of access networks 106 such that access to the CDN 102 may occur through another access network. In general, access to a CDN 102 (or underlying IP network associated with the CDN) may occur through any number of ingress ports to the CDN through any number of access networks. In yet another embodiment, the user device 104 may be a component of access network 106.

In one embodiment, the CDN includes a directory server 110 that responds to the request from the end user device 104 or access network 106 by providing a network address (e.g., an IP address) where the content associated with the selected link can be obtained. In one implementation, the directory server 110 provides a domain name system (DNS) service, which resolves an alphanumeric domain name to an IP address. The directory server 110 resolves the link name (e.g., URL or other identifier) to an associated network address from which the user device 104 can retrieve the content. However, the requesting device 104 may first obtain a manifest file from the CDN 102 that generally includes a uniform resource locator (URL) or a sequence of uniform resource identifiers (URIs) that identifies the locations of segments of the requested content. In other words, the manifest file lists or otherwise describes the segments of the requested content available from the CDN from which the requesting device may then obtain, through the DNS server 100, a particular content server within the CDN at which those segments are available.

In still another embodiment, a user of the user computing device 104 enters a link name (e.g., URL or other identifier) into a browser executed on the computing device. The link name is associated with a network address within the CDN 102 at which the content may be obtained and provided to the computing device. For example, the user of the user device 104 may enter a URL such as www.example.com/content into the browser of the computing device. Upon entering the URL, the hostname may be extracted by the browser (www.example.com in this particular case) and sends a request (possibly via an operating system running within the computing device 104) to a domain name server (DNS) associated with the user's access network 106. The DNS associated with the user's access network is known as the ISP resolver (shown best as access network DNS 212 of FIG. 2). In one example, the DNS request transmitted to the ISP resolver from the computing device 104 includes the hostname of the requested content, as well as an IP address associated with the computing device.

In one implementation, the CDN 102 includes an edge server 112, which may cache content from another server to make it available in a more geographically or logically proximate location to the user device 104. The edge server 112 may reduce network loads, optimize utilization of available capacity, lower delivery costs, and/or reduce content download time. The edge server 112 is configured to provide requested content to a requestor, which may be the user device 104 possibly via an intermediate device, for example, in the access network 106. In one implementation, the edge server 112 provides the requested content that is locally stored in cache. In another implementation, the edge server 112 retrieves the requested content from another source, such as a media access server (MAS) (e.g., a content distribution server 114 or a content origin server 116 of a content provider network 118). The content is then served to the user device 104 in response to the requests.

In addition, the CDN may broadcast to the access network 106 (or any other access network) connected to the CDN information concerning the content serving nodes available in the CDN. In particular, the CDN may broadcast Border Gateway Protocol (BGP) information about the access path to content serving CDN components. In general, BGP information (or BGP session, BGP feed or BGP data) is a table of Internet Protocol (IP) prefixes which designate network connectivity between autonomous systems (AS) or separate networks. BGP information for a network route may include path, network policies and/or rule-sets for transmission along the path, among other information. The BGP feed may also include Interior Gateway Protocol (IGP) information for network routes within an AS or network and/or other network information that pertains to the transmission of content from the CDN. BGP uses Transmission Control Protocol (TCP) as its transport protocol for exchanging routing information. Adjacent routers running BGP set up a TCP connection to exchange entire routing tables. Each router has enough information to determine an optimal next hop to a destination.

Figure 2:
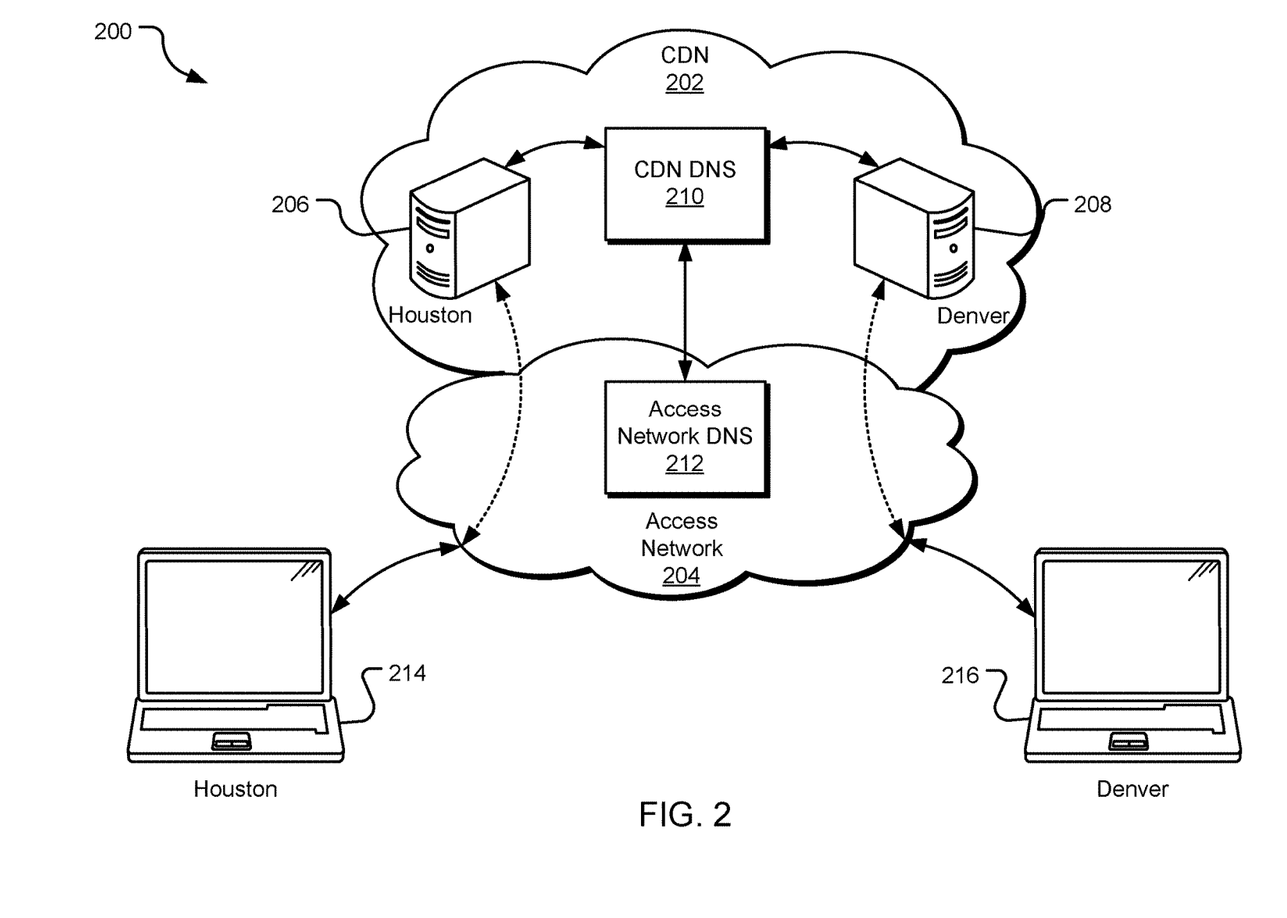
FIG. 2 is an example network environment for distributing content to an end user from a network utilizing an anycast addressing scheme.

As mentioned above, some components of the CDN 102 may be accessed through an anycast-routing scheme and some components may be accessed through a unicast-routing scheme. In general, "anycast" is a network routing technology that allows any number of possible nodes in a network to service a request. In anycast, multiple network nodes capable of servicing a request have the same network address—an anycast address. For example, FIG. 2 is an example network environment for distributing content to an end user from a network utilizing an anycast addressing scheme. The components of the network 200 of FIG. 2 are similar and operate in a similar manner as those described above. Thus, a CDN 202 is provided that is accessible to users 214, 216 through an access network 204. Further, an access network DNS 212 (also referred to as an ISP DNS) is provided in the access network 202 and/or a CDN DNS 210 is provided in the CDN 202. In addition, content servers 206, 208 may be included in the CDN 202, perhaps located in different geographic locations.

In the particular example shown, a content server 206 is located in or around Houston, Tex. and another content server 208 is located in or around Denver, Colo., although both content servers are a portion or component of the CDN 202. As also shown, many user devices may access the CDN 202 through the access network 204, such as a user device 214 located in Houston and another user device 216 located in Denver. It should be appreciated that manifest servers (discussed in more detail below) may also be included in the CDN 202 and disparately located in different geographic locations within the CDN. As a general rule, CDNs attempt to connect user devices 214, 216 to content servers and manifest servers 206,208 that are geographically near the user devices to reduce the distance that the content packets are transmitted through the CDN and access network 204.

As mentioned above, the DNS 210 returns an IP address of a content server of the CDN 202 from which content is available. Thus, each component 206,208 of the CDN 202 may announce an IP address for the content server through the BGP information that user devices 414,416 may utilize to connect to those components. In other embodiments, the information may be provided through any announcement technique, such as on behalf of the components 206,208. As explained, "anycast" is a network routing technology that allows any number of possible nodes in a network to service a request. In anycast, multiple network nodes capable of servicing a request have the same network address—an anycast address. Therefore, due to routing protocols of the Internet and networks more generally, when a device requests data from an anycast address or sends information to the anycast address, the request or the packets are directed to one of the nodes associated with the address, and it is often the closest node to the device. In particular, if the content server 408 in Denver announces an anycast address that the Denver-based user device 416 is searching for, the user device may connect to the Denver-based content server 408. Similarly, the Houston-based user device 414 may connect to a Houston-based content server 406, even though the content server in Houston 406 may announce the same anycast address that the content server in Denver 408.

However, because an anycast routing scheme tends to connect user devices to content servers that are geographically near the user device, conventional anycast schemes tends to not work well for content distribution when there are large localized high traffic events, and in other situations. For example, when numerous users in some area simultaneously requesting content (e.g., a live video stream), all of the requests may likely be directed to the node nearest the concentration of users with the anycast address. In such cases, the node may be overwhelmed and not able to handle the volume of traffic causing performance degradation for all of the users. If the node is then removed as a location for the anycast address, then the traffic, quite possibly during a live session, will be rerouted to a different node where the state of existing sessions will be lost and the congestion quite likely repeated at the new node "Unicast", in contrast, is a network routing technology that allows one node in a network to service a request. So, unlike in anycast, the unicast address is associated with a particular node that the requesting device will connect to, e.g., for a TCP session, to obtain content. With respect to anycast or unicast, the term "node" is meant to refer to a server or a collection of servers, which may in some specific examples be considered a cache or edge cache, and that are tasked with serving some form of content in response to a request. Protocols exist for determining the best unicast address (node) to service any given request.

One challenge in determining the best node involves ambiguity as to the location of the device making the request. In many conventional DNS resolution solutions, the IP address and identity of an ISP DNS resolver (such as DNS 212 of access network 204) and not the actual requesting device, is used to determine the node to service the request. However, many times the ISP DNS 212 is not a good proxy for identifying the location of the particular requesting device. Services and databases are available that associate IP addresses with geographical and other useful information. However, in some instances, the node selected to handle the request is distant from the requesting device, which may lead to various inefficiencies in servicing the request including relatively longer latency, dropped packets, greater expense, and the like, relative to selecting a unicast node more logically and/or geographically proximate the requesting device.

Similar approaches may be implemented for accessing a manifest server of a CDN. That is, a manifest server of the CDN 402 may announce a unicast address or an anycast address through which the requesting device may request and obtain a manifest for the desired content. As mentioned above, the manifest for a requested content generally includes a URL or a sequence of URIs that identifies the locations of segments of the requested content. In other words, the manifest file lists or otherwise describes the segments of the requested content available from the CDN 402 from which the requesting device may then obtain a particular content server within the CDN at which those segments are available. However, due to conventional routing protocols, the initial connection between the client device 416 and the manifest server 408 will most likely be at the logically geographically closest manifest server able to service the request. However, the IP address of the requesting device 416 will not likely be known. Thus, the anycast server receiving the manifest request can provide a useful data point or to the location in the network of the requesting device without having any specific information about the requesting device itself.

In one particular embodiment of a CDN, the content servers may have unique IP address, which may be unicast addresses. The manifest servers, in contrast, may share a common IP address, which may be an anycast address. The anycast address is advertised to components of networks in communication with the manifest servers from each anycast node using a dynamic routing protocol such as a BGP to enable those routers to make intelligent routing decisions as to the best path.

Figure 3:
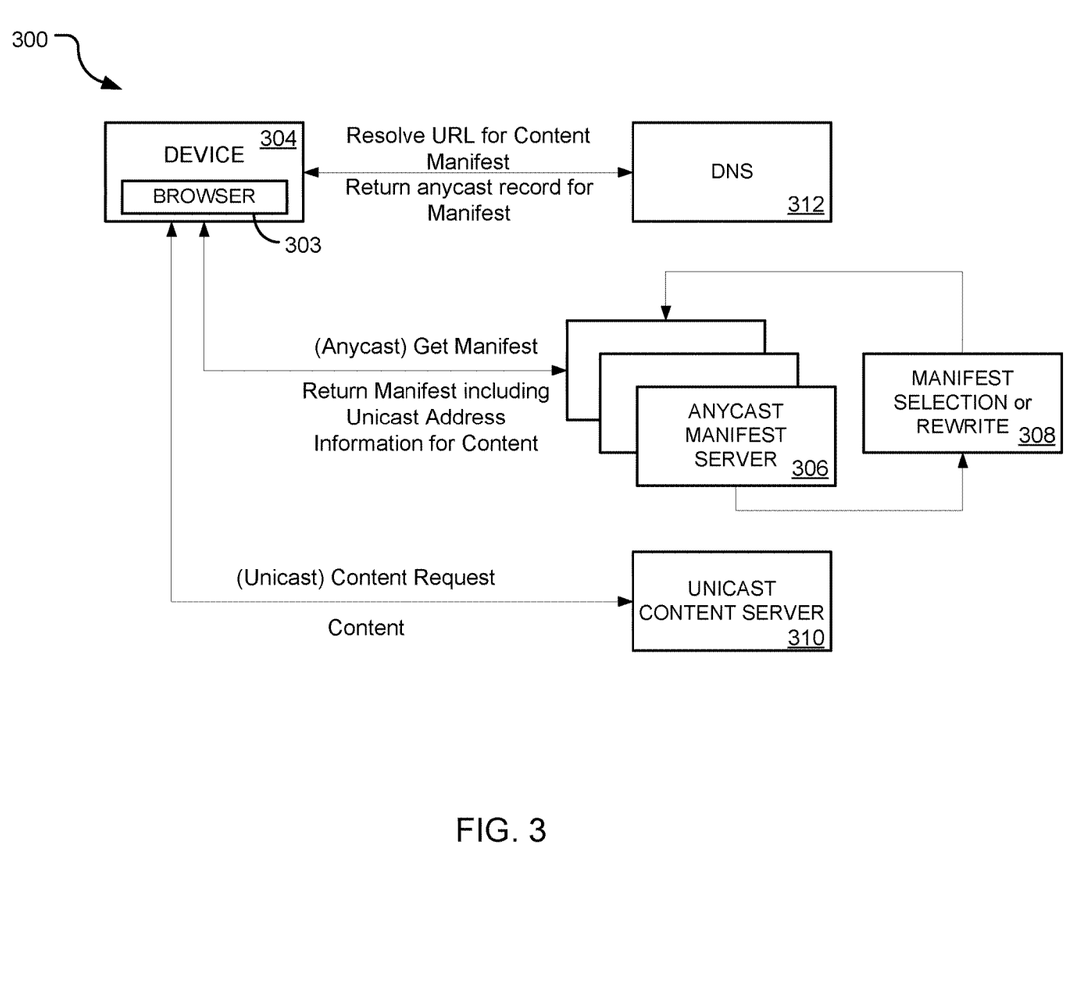
FIG. 3 is a system and method diagram illustrating a first example manifest and content delivery embodiment.

Referring now to FIG. 3, a first example manifest and content delivery system and communication flow is illustrated. Many of the components of the system 300 of FIG. 3 are discussed above. In particular, the system 300 includes a user device 304 that utilizes a browser 303 to request and obtain content from a CDN. The CDN may include a DNS server 312, manifest servers 306 for storing and providing a content manifest, and a content server 308 for providing the content. In some instances, the DNS 312 may be an ISP DNS included in the user's access network. FIG. 3 also illustrates several communication exchanges between the components of the system 300 in accordance with the present disclosure.

Initially, the DNS 312 is provided with an anycast address for a manifest server 306 storing a manifest file associated with some content. So, for example, an anycast address for a video file accessible over the CDN is provided to the DNS 312. More particularly, the user device 304 transmits a request to the DNS 312 for a location of a manifest file associated with a content file available through the CDN. In one example, the manifest request includes a URL for the requested content. The DNS 312 resolves the request for the content and returns an address to a manifest server within the CDN at which the manifest for the requested content is available. In one example, the returned address is an anycast address that is common to more than one manifest server 306 of the CDN.

The anycast address for the manifest server 306 may be, for example, an A or AAAA record (e.g., in IPv4 or IPv6 anycast address). In this first step, the IP address of the user device 304, as well as other information about the device, is often not available to the DNS system 312. Note, contacting DNS 312 may involve several operations depending on the DNS system and to what extent the DNS records are available at the first device contacted or whether additional devices, such as authoritative name servers, may also need to be queried. Nonetheless, when DNS addresses the request, it is usually a resolver address or information that is available to DNS. The resolver is a device or otherwise a service of the ISP serving the customer of the device, and that is involved in interacting with DNS to obtain an IP address for the requesting client device.

Upon receiving the manifest address, the user device 304 then uses the anycast address to communicate with some device of the CDN to obtain the manifest. As mentioned above, one or more nodes of the CDN may have the anycast address. Moreover, those nodes may be logically and/or geographically dispersed. Conventional network routing will typically connect the requesting device 304 with the most efficient device (i.e., the closest device) to service the request. Thus, the user device 304 follows the anycast address to the manifest server 306 to request the content manifest. At this point in the sequence, the request made to the manifest server 306 will include information relevant to the requesting device as opposed to the resolver. For example, in establishing a TCP connection with the anycast manifest server 306, the IP address of the user device 304 may be available to the manifest server, as well as attributes about the device such as the operating system, the type of device (mobile, etc.), the type of connection (e.g., wireless (e.g., WiFi, 3G, 4G, and the like)) or wired, the speed of the connection, and other attributes. Further, the system 300 will know at which anycast device 306 the request was received. Such information may be utilized by the system 300 to further facilitate providing the content to the user device 304.

As explained in more detail below, the anycast manifest server 306 may select and return 308 a manifest to the user device 304 based on the information received or derived from the manifest request. In another embodiment, the anycast manifest server 306 may create, rewrite, or edit 308 a stored manifest file in response to the received information. Regardless, a manifest file (or portion of a manifest file) is returned to the user device 304 by the manifest server 306. The manifest, either through methods to select the proper manifest or manifest rewriting, includes a unicast address, or more typically a sequence or collection of unicast addresses, at which the actual content may be received from one or more content servers 310. For content associated with a manifest file, the manifest file defines a set of chunks that collectively make up the content. For example, a video file may be a collection of chunks of the video. The manifest file also includes information as to how to access the chunks.

For example, the manifest may include a collection of URLs that contain location specific information to tell the DNS system where the client is or the best location from which to serve the content. The DNS system may then pick a server and return a unicast address for the selected server. Alternatively, the manifest file may include a collection of actual unicast addresses for each chunk. Hence, to play the video at a client device, the client device 304 (e.g., the browser 303 running on the client device) requests each chunk using the associated unicast address from the CDN, whether based on resolving the associated URLs or the IP addresses directly, and then plays the video using the received chunks. Stated differently, for a video, the manifest may reference or include several unicast IP addresses each related to a chunk of the video. Using the manifest, the client device 304 accesses a content server 310 of the CDN over a TCP connection to request a chunk of the file from the indicated content server using the unicast IP addresses for each chunk, which are then each served from the device, or devices, associated with the unicast IP addresses.

Figure 4:
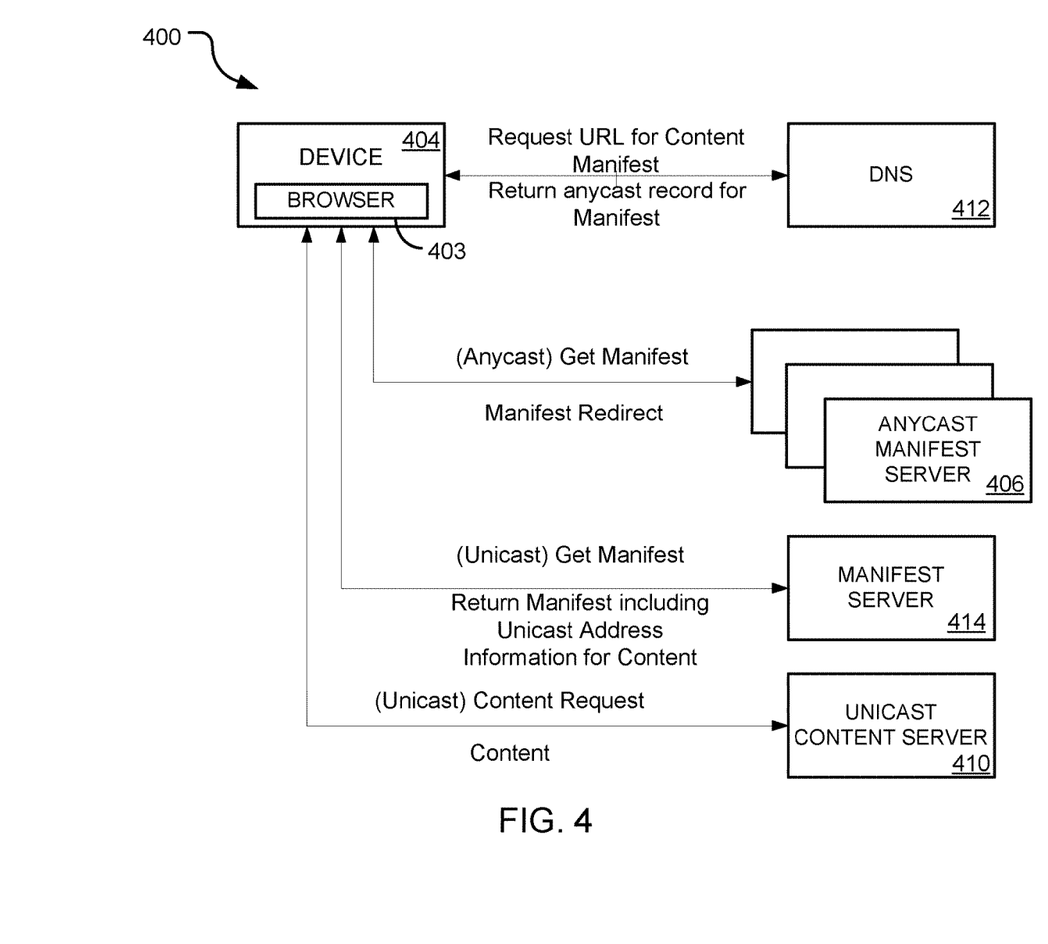
FIG. 4 is a system and method diagram illustrating a second example manifest and content delivery embodiment.

FIG. 4 illustrates a second example manifest and content delivery system 400. Many of the components of the system 400 are similar or the same as the system 300 of FIG. 3 discussed above. In particular, the system 400 includes a user device 404 that utilizes a browser 403 to request and obtain content from a CDN. The CDN may include a DNS server 412, one or more anycast manifest servers 406, one or more unicast manifest servers 414, and one or more content servers 408 for providing the content. In addition, the system 400 also includes several communication exchanges between the components of the system in accordance with the present disclosure.

In this embodiment, the user device 404 requests content from the DNS 412 as above and receives an anycast address for manifest servers 406 of the CDN. However, rather than providing the manifest to the user device 404, the anycast server 406 may redirect the user device to a separate unicast manifest device 414. In other words, the anycast manifest server 406 may identify some attribute of the request and provide information for another location or device of the CDN where the manifest may be retrieved. In one example, the manifest request may be redirected to a different address where the manifest is retrievable. The redirection may be based on some attribute of the request or the location where the initial request was received and may redirect the user device 404 to a unicast manifest server 414 that is based on the user device information obtained from the manifest request. The unicast manifest server 414 may then return the manifest that includes URL or other location information for content chunks at one or more content servers 410 of the CDN, as explained above.

Figure 5:
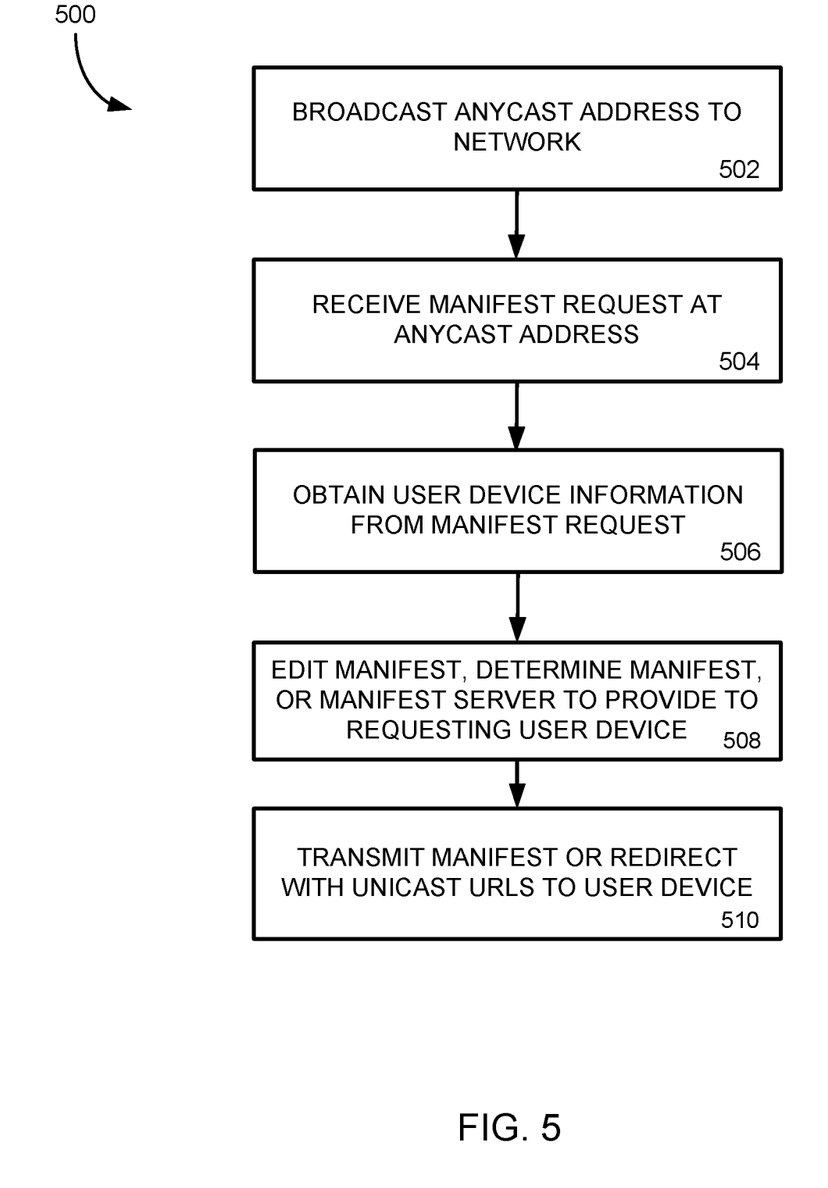
FIG. 5 is a flowchart of a method for utilizing a manifest server of a CDN with an anycast-type address.

FIG. 5 is a flowchart of a method 500 for utilizing a manifest server of a CDN with an anycast-type address. Thus, the operations of the method 500 may be performed by the anycast manifest servers 306, 406 of FIGS. 3 and 4 described above. It should be appreciated, however, that the operations may be performed by any component of a telecommunications network or CDN to provide a manifest for content to a requesting user device.

Beginning in operation 502, the anycast manifest server broadcasts an anycast IP address at which the manifest server may be reached. It should be appreciated that other manifest servers of the CDN may also broadcast the same anycast address. In one particular embodiment, the anycast address is broadcast utilizing BGP announcements or signaling protocols. In operation 504, the manifest server receives a request for a manifest of a particular content from a user device. As explained above, the user device may receive the anycast manifest server address from a DNS and follow the address to the anycast manifest server. Once connected, the user device may request a manifest for a particular content file available through the CDN.

In operation 506, the manifest server may obtain information of the requesting user device from the received manifest request. For example, the server may determine or estimate the IP address of the user device, as well as attributes about the device such as the operating system, the type of device (mobile, etc.), the type of connection (e.g., wireless (e.g., WiFi, 3G, 4G, and the like)) or wired, the speed of the connection, and other attributes. The manifest server may also access one or more databases to determine attributes of the user device. Using the example of the IP address of the user device, the manifest server may access a database of known or estimated geographic locations of devices with known IP addresses to estimate a location of the user device. In general, any information included in the request and/or available from one or more databases of user information may be utilized by the manifest server to determine certain attributes about the user device.

With the obtained or derived information of the user device, the manifest server may provide a manifest, edit a manifest, or redirect the user device to another manifest server. For example, if there are three anycast manifest servers dispersed in different geographical locations of the CDN, there may be three associated manifests that tie content requests within the manifest based on the geographical location of the anycast servers. In such an arrangement, in a first geographical location, say New York, the associated manifest may include a collection of location-specific URLs associated with content chucks at a content delivery node in the New York region, whereas in a second geographic location, say Denver, the associated manifest may include a collection of IP addresses associated with content chucks at a content delivery node in the Denver area. Thus, if the request is received at the New York anycast server, the New York orientated manifest is selected and returned to the device. Similarly or additionally, if the IP address of the requesting device is linked with New York, then that information may be used to also select the New York manifest. Further, the combination of information may also be used. Similarly but alternatively, fields within the manifest may be rewritten or edited. So, rather than different selectable manifests, fields within the manifest may be rewritten based on the request. Thus, the unicast address for a content server in New York or the unicast address for the content server in Denver, may be written to the manifest based on the anycast server receiving the request and/or the IP address of the device requesting the manifest. In other words, the manifest server may attempt to associate a geographic location with the requesting device and select or alter a manifest that relates the estimated geographic location of the user device. This operates to connect the user device to potentially local content servers from which the chunks of the content may be provided.

In another embodiment, the manifest server may provide a redirect instruction to the requesting user device to direct the device to a unicast manifest server based on the user device information. Thus, the anycast manifest server may determine that a unicast manifest server is best selected to provide the manifest to the user device and direct the user device accordingly. In general, the editing or selecting of a manifest or redirecting of the requesting device to another manifest server may occur based on any information obtained or derived by the manifest server. For example, the anycast manifest server may estimate a geographic location of the requesting device and select a particular manifest to connect the device to content servers that are near the requesting device. In another example, the anycast manifest server may edit a manifest for a content to include identified content servers that are near the requesting device. In yet another example, the anycast manifest server may incorporate a load balancing of the content servers of the CDN to prevent any one server from servicing too many content requests. Also, the anycast manifest server may consider certain network structuring to determine which content server to include in the manifest or which unicast manifest server to redirect the user device. In general, any information of the user device, the network, or the received request may be utilized to select or edit a manifest or manifest server.

In yet another embodiment, the manifest server may edit the manifest to include information that may be used by other components of the CDN to make decisions on which content server to connect the user device. For example, the manifest may be edited to insert the user device's IP address into the hostname portion of the URLs included in the manifest. The components of the network may then be programmed or configured to extract this IP address from the URLs when received from the user device and use that information to determine or select a content server to provide the content. In general, any edits or information may be included in the manifest by the manifest server to control the connection of the user device to the CDN to provide the requested content to the device.

Figure 6:
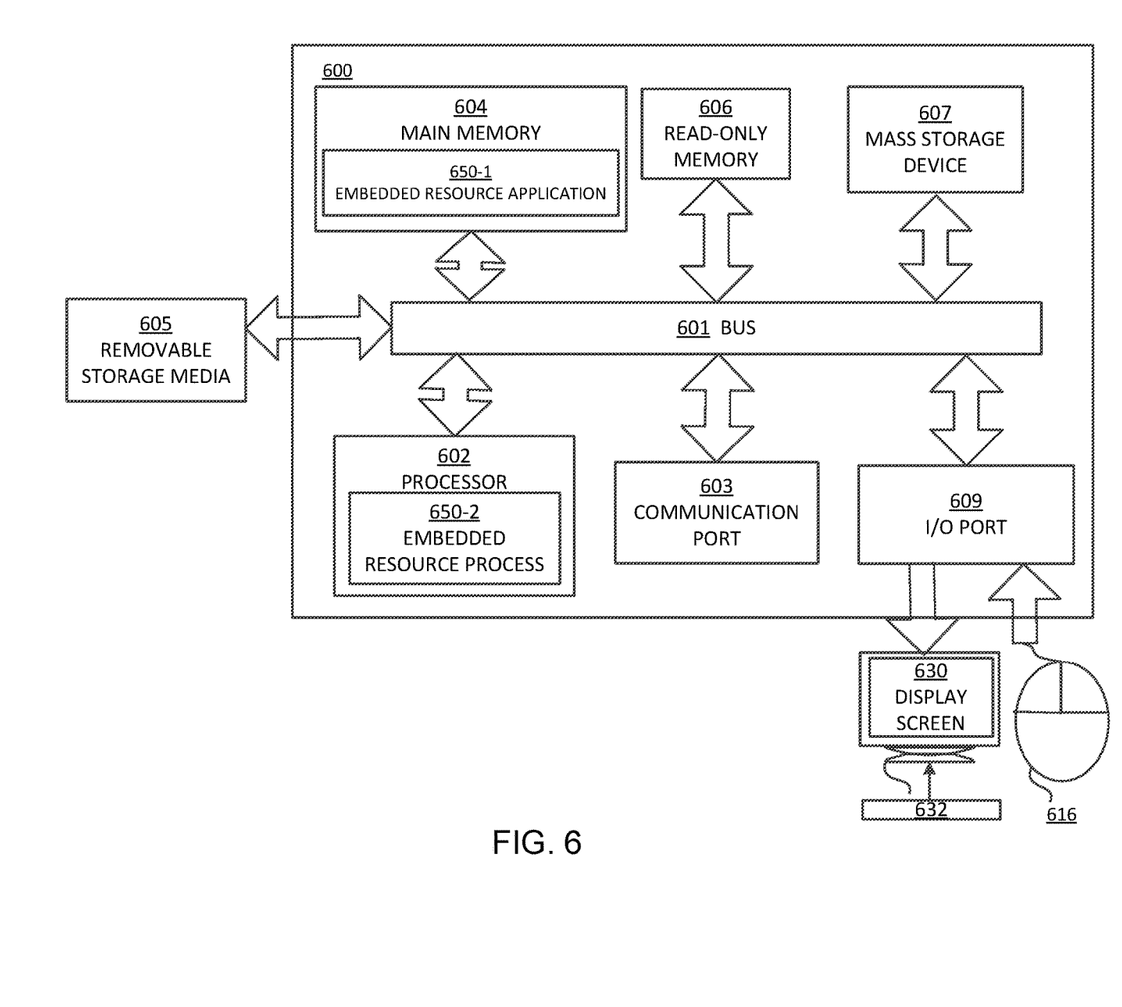
FIG. 6 is a computer architecture diagram illustrating one possible system capable of implementing various aspects of the present disclosure.

Through the systems and methods discussed above, an anycast manifest server may be provided in a CDN to provide a manifest to a requesting device through the anycast address. The manifest server of the CDN may select the provided manifest based on information received from the requesting device and/or any other network information, may alter attributes of the manifest itself (manifest rewrite), or direct the requesting device to a different device or manifest server of the CDN to obtain the manifest. The selection of the manifest, alteration of the manifest, or new location to obtain the manifest causes the connection for content, which may be chunks of content defined in the manifest, to occur at one or more servers accessible through a unicast address, rather than an anycast address. Thus, the original short lived connection (or connections) to obtain the manifest from the manifest server involves an anycast address. The connection to the manifest server associated with the anycast address, alone or in conjunction with information about the device requesting the manifest, may then be used in establishing a unicast connection to obtain the content from a content providing serve FIG. 6 is example schematic diagram of a computing system 600 implementing a server, client device, or other compute system configured to execute or implement the methods or system components discussed herein. The computing system, which may include an application 608 with instructions for implementing the methods discussed herein, includes a bus 601 (i.e., interconnect), at least one processor 602 or other compute element, at least one communication port 603, a main memory 604, a removable storage media 605, a read-only memory 606, and a mass storage device 607. Processor(s) 602 can be any known processor, such as, but not limited to, an Intel® based processor(s), AMD® processor(s), or other various types of processors, cores, and the like. Communication port 603 can be a 10/100 Ethernet port, a Gigabit port using copper or fiber, or a USB port or other type of port Communication port(s) 603 may be chosen depending on a network such as a Local Area Network (LAN), a Wide Area Network (WAN), or any network to which the computer system 600 connects. The application may be in communication with peripheral devices (e.g., display screen 630, input device 616 via Input/Output (I/O) port 609).

Main memory 604 can be Random Access Memory (RAM) or any other dynamic storage device(s) commonly known in the art. Read-only memory 606 can be any static storage device(s) such as Programmable Read-Only Memory (PROM) chips for storing static information such as instructions for processor 602. Mass storage device 607 can be used to store information and instructions. For example, hard disks such as the Adaptec® family of Small Computer Serial Interface (SCSI) drives, an optical disc, an array of disks such as Redundant Array of Independent Disks (RAID), such as the Adaptec® family of RAID drives, or any other mass storage devices, may be used.

Bus 601 communicatively couples processor(s) 602 with the other memory, storage and communications blocks. Bus 601 can be a PCI/PCI-X, SCSI, or Universal Serial Bus (USB) based system bus (or other) depending on the storage devices used. Removable storage media 605 can be any kind of external hard drives, thumb drives, Compact Disc—Read Only Memory (CD-ROM), Compact Disc—Re-Writable (CD-RW), Digital Video Disk—Read Only Memory (DVD-ROM), etc.

Embodiments herein may be provided as a computer program product, which may include a machine-readable medium having stored thereon instructions which may be used to program a computer (or other electronic devices) to perform a process. The machine-readable medium may include, but is not limited to, optical discs, CD-ROMs, magneto-optical disks, ROMs, RAMs, erasable programmable read-only memories (EPROMs), electrically erasable programmable read-only memories (EEPROMs), magnetic or optical cards, flash memory, or other type of media/machine-readable medium suitable for storing electronic instructions.

As shown, main memory 604 is encoded with an application 650-1, which may include functionality described herein and that supports functionality as discussed above and as discussed further below. For example, in one embodiment, the application 650-1 may include or otherwise implement the various processes and/or instructions described herein. The application 650-1 (and/or other resources as described herein) can be embodied as software code such as data and/or logic instructions (e.g., code stored in the memory or on another computer readable medium such as a disk) that supports processing functionality according to different embodiments described herein. During operation of one embodiment, processor(s) 602 accesses main memory 604 via the use of bus 601 in order to launch, run, execute, interpret or otherwise perform the logic instructions of the 650-1.

The description above includes example systems, methods, techniques, instruction sequences, and/or computer program products that embody techniques of the present disclosure. However, it is understood that the described disclosure may be practiced without these specific details. In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium, optical storage medium (e.g., CD-ROM); magneto-optical storage medium, read only memory (ROM); random access memory (RAM); erasable programmable memory (e.g., EPROM and EEPROM); flash memory; or other types of medium suitable for storing electronic instructions.

It is believed that the present disclosure and many of its attendant advantages should be understood by the foregoing description, and it should be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it should be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A method of serving content in a network comprising:
   receiving a request, from a requesting device, for a content manifest at a particular serving node associated with an anycast address, the particular serving node being one of a plurality of manifest serving nodes associated with the anycast address and the request comprising information of the requesting device in communication with the particular serving node;
   evaluating, based on information from the requesting device, whether to provide the content manifest, edit the content manifest, or redirect the user device to another manifest server;
   determining, based on the evaluation, to edit the content manifest to include at least one unicast address of a content delivery node suitable for delivering the content to the requesting device;
   editing the content manifest; and
   serving the content manifest to the requesting device; and
   transmitting the content from the content delivery node associated with the unicast address to the requesting device.

2. The method of claim 1 further comprising:
   establishing the anycast address with a domain name service (DNS) infrastructure for the content manifest associated with the content.

3. The method of claim 1 wherein editing the content manifest comprises:
   selecting the content manifest from a plurality of content manifests associated with the content, the selection based on the information of the requesting device in the request for the content manifest.

4. The method of claim 3 wherein editing the content manifest further comprises:
   modifying the content manifest to include the at least one unicast address of the content delivery node, the modification based at least on the information of the requesting device in the request for the content manifest.

5. The method of claim 1 wherein serving the content manifest comprises:
   transmitting a redirect instruction to the requesting device, the redirect instruction comprising a Uniform Resource Locator (URL) representing a unicast address for a unicast manifest server of the network, the redirect instruction based at least on the information of the requesting device in the request for the content manifest.

6. The method of claim 3 wherein the information of the requesting device comprises an Internet Protocol (IP) address of the requesting device.

7. The method of claim 6 further comprising:
   accessing a database of IP addresses and associated estimated geographic locations, wherein the selecting of the content manifest to the requesting device is further based on an estimated geographic location associated with the IP address of the requesting device.

8. The method of claim 1 wherein the information of the requesting device comprises at least one of an operating system of the requesting device, a type of the requesting device, a type of connection between the requesting device and the particular serving node, or a speed of the connection between the requesting device and the particular serving node.

9. A content delivery network (CDN) comprising:
   an anycast manifest server receiving a request for a content manifest, the anycast manifest server being one of a plurality of manifest serving nodes associated with an anycast address and the request comprising information of a requesting device in communication with the CDN; and
   a unicast content server transmitting at least a portion of content file to a requesting device in communication with the unicast content server,
   wherein the anycast manifest server:
      evaluates, based on information from the requesting device, whether to provide the content manifest, edit the content manifest, or redirect the user device to another manifest server;
      determines, based on the evaluation, to edit the content manifest to include at least one unicast address of a content delivery node suitable for delivering the content to the requesting device; and
      provides the content manifest to the requesting device based on the information of the requesting device in the request.

10. The CDN of claim 9 further comprising:
    a domain name service (DNS) infrastructure storing the anycast address for the content manifest associated with the content.

11. The CDN of claim 9 wherein providing the content manifest comprises selecting the content manifest from a plurality of content manifests associated with the content, the selection based on the information of the requesting device in the request for the content manifest.

12. The CDN of claim 11 wherein providing the content manifest further comprises modifying the selected content manifest to include the at least one unicast address of the unicast content server, the modification based at least on the information of the requesting device in the request for the content manifest.

13. The CDN of claim 9 further comprising:
a unicast manifest server available at a unicast address; and
wherein providing the content manifest comprises transmitting a redirect instruction to the requesting device comprising the unicast address for the unicast manifest server, the redirect instruction based at least on the information of the requesting device in the request for the content manifest.

14. The CDN of claim 11 wherein the information of the requesting device comprises an Internet Protocol (IP) address of the requesting device.

15. The CDN of claim 14 further comprising:
a database of IP addresses and associated estimated geographic locations; and
wherein the selecting of the content manifest to the requesting device is further based on an estimated geographic location associated with the IP address of the requesting device.

16. The CDN of claim 9 wherein the information of the requesting device comprises at least one of an operating system of the requesting device, a type of the requesting device, a type of connection between the requesting device and the particular serving node, or a speed of the connection between the requesting device and the particular serving node.

17. A server of a content delivery network (CDN) comprising:
at least one communication port for receiving a request for a content manifest from a content requesting device in communication with the CDN, the request for the content manifest received in response to a broadcast of an anycast address of the server and comprising information of the content requesting device;
a processing device; and
a computer-readable medium connected to the processing device configured to store information and instructions that, when executed by the processing device, performs the operations of:
evaluating, based on information from the requesting device, whether to provide the content manifest, edit the content manifest, or redirect the user device to another manifest server;
serving the content manifest to the content requesting device based on the information of the content requesting device in the request, the content manifest comprising at least one unicast address of a content delivery node of the CDN suitable for delivering the content to the content requesting device; and
transmitting the content from the content delivery node associated with the unicast address to the content requesting device.

18. The server of claim 17 wherein the broadcast of the anycast address of the server comprises a border gateway protocol (BGP) announcement.

19. The server of claim 17 wherein serving the content manifest comprises:
selecting the content manifest from a plurality of content manifests associated with the content, the selection based on the information of the content requesting device in the request for the content manifest.

20. The method of claim 19 wherein serving the content manifest further comprises: modifying the content manifest to include the at least one unicast address of the content delivery node, the modification based at least on the information of the content requesting device in the request for the content manifest.

* * * * *